United States Patent

Martin

[11] Patent Number: 5,841,667
[45] Date of Patent: Nov. 24, 1998

[54] EVALUATION OF SIGNAL-PROCESSOR PERFORMANCE

[75] Inventor: Andrew Louis Martin, Ferny Creek, Australia

[73] Assignee: Martin Communications Pty Ltd., Mount Waverley, Australia

[21] Appl. No.: 696,833
[22] PCT Filed: Feb. 24, 1995
[86] PCT No.: PCT/AU95/00093
  § 371 Date: Aug. 26, 1996
  § 102(e) Date: Aug. 26, 1996
[87] PCT Pub. No.: WO95/23462
  PCT Pub. Date: Aug. 31, 1995

[30] Foreign Application Priority Data

Feb. 25, 1994 [AU] Australia .................. PM4112

[51] Int. Cl.⁶ .................................................. G06F 17/18
[52] U.S. Cl. ............... 364/551.01; 364/554; 364/582
[58] Field of Search ................................... 364/554, 582, 364/551.01; 395/183.14

[56] References Cited

U.S. PATENT DOCUMENTS

| | | | |
|---|---|---|---|
| 3,021,069 | 2/1962 | Rowley et al. | 364/554 |
| 3,348,031 | 10/1967 | Russell, Jr. et al. | 364/554 |
| 3,400,370 | 9/1968 | Fukamachi | 364/554 |
| 4,507,741 | 3/1985 | White | 364/554 |
| 4,748,573 | 5/1988 | Sarandrea et al. | 364/554 |

FOREIGN PATENT DOCUMENTS

| | | |
|---|---|---|
| 43227/85 | 11/1985 | Australia . |
| 0 403 147 | 12/1990 | European Pat. Off. . |
| 89/12364 | 12/1989 | WIPO . |

OTHER PUBLICATIONS

Derwent Abstract Accession No. 94-073361/09, Class S01, RU, A, 2002372, (Voron Communication Inst.), Oct. 30, 1985.

Figure 6.28, "Digital Line of Sight Radio Links: A Handbook", by Townsend, published by Prentice Hall in (1988).

*Primary Examiner*—Emanuel Todd Voeltz
*Assistant Examiner*—Matthew Smithers
*Attorney, Agent, or Firm*—Foley & Lardner

[57] ABSTRACT

The present invention provides a method and apparatus for evaluating the performance of a signal-processing device during a test period when an input signal is applied to the signal-processing device and an output signal is generated by it. A select profile of the input (or output) signal quality is derived at intervals in which the output (or input) signal lies within some predetermined range. The derived profile may be normalized with respect to the quality of the input (or output) signal throughout the test period. The profile is indicative of device performance of the device being tested. The method may be implemented in either hardware or software.

16 Claims, 8 Drawing Sheets

OCCURRENCES of IBAD at BER >10E$^{-7}$

EVALUATION OF SIGNAL-PROCESSOR PERFORMANCE

TECHNICAL FIELD

This invention relates to methods and apparatus for evaluating the performance of complex signal processing devices and systems, particularly those which incorporate or make use of non-linear processes and which are subject to unpredictable fluctuations in input signal quality. The devices and systems may have digital inputs and outputs (D-D), analogue inputs and outputs (A-A), analogue inputs and digital outputs (A-D) or digital inputs and analogue outputs (D-A).

Examples of such devices and systems are: modems (modulators and demodulators) which are generally A-D and D-A devices; codecs (data compression and decompression devices) which may be D-D or A-A; encryptors and de-encryptors, digital error correcting systems and digital switching systems (usually D-D); signal equalisers, space-diversity signal combiners, IF-equalisers and various other signal distortion-correcting means (usually A-A); A-D and D-A converters; systems used in the recording and playing-back signals (such as analogue or digital magnetic tape systems and magnetic or optical disc systems) and systems for transmitting and receiving signals over a data or telecommunications medium (which may be any of the four species). Indeed, the principles of this invention can also be applied to the evaluation of some forms of transducers which can be regarded as signal-processing devices.

This invention may be used for the rapid, qualitative and quantitative comparison of the performance of a test signal-processing device with a similar reference device, or for determining whether and to what degree the performance of a given device has degraded over time (by comparing current performance with a record of earlier performance). Thus, the methods and apparatus of the invention are suited to the calibration of complex signal-processing devices against reference standards for the purpose of meeting device performance specifications.

While the most important and beneficial applications of this invention will be in the evaluation of signal-processing devices with non-linear characteristics (ie, those for which accurate transfer functions normally cannot be derived), its use is not confined to such complex systems as it may also be used in the assessment of nominallylinear systems and devices.

BACKGROUND TO THE INVENTION

Evaluating the performance of complex DSP (digital signal-processing) devices for the purpose of calibration or reliability assessment, or for checking performance-drift over time, can be a time consuming task. For example, modern 16 and 256 QAM (quadrature amplitude modulated) modems are expected to have symbol error rate probabilities (Pe) of better than $10^{-13}$ (corresponding to double-sided S/Ns [signal to noise ratios] of about 24.5 and 34.7 dB respectively). Many modems claim a Pe of better than $10^{-14}$, taking into account the combined effects of noise, distortion and modem calibration error. To meet such specifications, modem manufacturers must calibrate each modem by lengthy trial-and-error measurement and adjustment procedures. This cannot be done, for example, by simply adjusting voltages, currents, carrier phase, decision thresholds and the like parameters to their design values (or to the same values measured in a reference modem), for such modems include non-linear sub-systems (eg, signal equalisers, digital error-correctors, and discriminators).

If the performance specifications of a 16 QAM modem require a BER (bit error ratio) better than $1:10^{-12}$ when input S/N is 24.5 dB, there is little alternative but to generate and apply a test signal with that S/N to the modem being calibrated, count the output errors and adjust the calibration variables by trial and error until the specification is met. Because very low error rates are involved, calibration can take a long time so that the calibration of a high-performance modem can represent a significant proportion of the cost of the device. The situation is even more onerous where (as is now common) high-performance modems are claimed to be tolerant to rapid multipath fading, group delay and other forms of input signal distortion (besides noise and amplitude distortion).

It will be appreciated that the case of high-performance modems is illustrative of the situation which exists with regard to the evaluation or calibration of many other forms of digital and analogue signal-processing devices. In general, it is necessary with all such devices to apply an input signal (degraded according to the specification), measure the output errors for a sufficient time to determine whether they are within specification, make an adjustment, collect new error data to determine whether the adjustment resulted in an improvement or not, re-adjust the device and repeat the sequence for another parameter until the modem performs within specification or is rejected. The error check can be made with reference to data carried by the original undistorted signal or, in the case of DSP devices, can be via check-sum, paritychecking and the like which do not require access to the original digital data.

OBJECTIVES OF THE INVENTION

The general objective of the present invention to provide improved means for evaluating the performance of signal-processing devices or systems.

It is desirable to provide a simple graphical representation of the device or system (over its entire operational range and despite variations of input signal quality) so that the effects—some perhaps unexpected—of parameter adjustment can be quickly perceived. Such a graphical representation will allow the performance of two devices (eg, a reference and a test device, or a test device at different times) to be rapidly compared by superimposing or otherwise contrasting the graphical representations generated for each.

While examples will be described which meet all these desires, it will be sufficient for the purposes of this application for any one of the desires to be met.

SUMMARY OF THE INVENTION

The present invention is based upon the realisation that statistical comparison of the input and output signal quality of a device can be used to provide a valuable indicator of device performance by deriving a profile (herein after called the select profile) of input signal quality variation for intervals corresponding to times when the output signal quality lies within a predetermined range or reaches a predetermined threshold. The select profile, preferably after adjustment or normalisation to reflect the overall profile of input signal quality, may be represented graphically and used as an indicator of device performance.

In this context, a profile can be regarded as a frequency or probability plot, tabulation, or histogram of a series of signal quality samples arranged in increments of signal quality, so that samples falling within one increment are grouped together and represented by a count (frequency) or probability for that signal increment over the test period. Adjustment of the select profile to reflect the variation of input signal quality during the test period (herein called the "overall profile") may be achieved in a variety of ways known in the art, most usually by dividing or differencing (i.e. finding the difference of) the counts of the select and overall profiles increment by increment of input signal quality. While adjustment by division is often referred to as normalisation in the art, the term 'normalisation' will be used herein to indicate any suitable statistically valid form of adjustment known in the art.

From another aspect, the invention comprises a method of evaluating the performance of a signal-processing device during a test period by: applying an input signal to the device and generating an output signal derived from the input signal, repetitively sampling the quality of the input signal at discrete intervals to generate an overall profile of input signal quality, sampling the output signal quality, determining whether the output signal quality falls within a predetermined range or not, generating a select profile of input signal quality samples comprising those samples corresponding to intervals when the output signal quality falls within said range, and employing the select profile as an indicator, or to generate an indicator, of device performance during the test period.

It should be noted that the above methods are symmetrical in that 'input' and 'output' can be interchanged.

To quickly compare the performance of the test device with a reference device, or to compare the performance of the test device before and after adjustment (or after a period of service, for example) the relevant select profiles can be graphically compared and contrasted (eg, by overlay, division or differencing), provided they have been generated using the same or similar sampling criteria, range-thresholds and normalisation methods. The comparison may be effected digitally and the resultant difference profile mathematically manipulated (eg, by taking logarithms or by differentiation) to generate a composite profile providing an enhanced visual display of the differences between the two select profiles being compared. While iterative adjustments of each of a plurality of calibration variables may still be needed to bring a device such as a modem into specification, the above graphical techniques allow each iteration to be effected many times faster than the conventional trial and error methods.

Nevertheless, it should be understood that this invention is not confined to the use of graphical methods, as numerical representations of the profiles may also be used and may be more suitable in some situations. For example, the area under or over a profile can be integrated to obtain a one-dimensional indicator of device performance, or a simple subtractive comparison of a selected portion of each profile may be sufficient for the purpose of adjusting a particular type of device that is known (from experience) to be likely to vary from the standard in a particular respect.

From another aspect, the invention comprises circuit means for use in evaluating the performance of a signal processing device which is adapted to receive an incoming signal and to generate an outgoing signal derived therefrom, the circuit means comprising: a first input for receiving one of said device signals as a first input signal, a second input for receiving the other one of said device signals as a second input, first gate means connected to said first input for sampling the quality of the first input signal at regular time intervals during an evaluation period, first accumulator means connected to said first gate means adapted to accumulate sample counts according to increment of signal quality, second gate means connected to said second input for sampling the quality of the second input signal at said time intervals, and discriminator means connected to said second input and adapted to determine, for each sample of second input signal quality, whether or not the signal quality lies within a predetermined range, said discriminator being connected to prevent said first accumulator means from storing sample counts during time intervals when the quality of said second input signal lies outside said range, the profile of counts in said accumulator at the end of the evaluation period providing an indicator of device performance.

The circuit means may include a second accumulator connected to receive all sample counts of first input signal quality according to increment of signal quality, or to receive sample counts only during intervals when said second input signal quality lies outside said range, and normalisation means adapted to adjust said profile of counts in accordance with the profile of total sample counts of first input signal quality. The circuit means may also include a microprocessor and associated memory and monitor or printer adapted to store and display the test profile together with one or more similar reference profiles in overlaid or composite format.

The input signal to the signal-processing device can be a 'natural' signal produced by an actual transmission path, or it can be one generated by a device which simulates the distortions and noise of such a signal path. (An example of a device capable of simulating multi-path fading in transmitted signals is provided by our patent application PCT/AU89/00254). Further, since the method and apparatus of the invention are applicable to sub-components of a signal-processing system, the input signal can be a partially processed signal representative of the intermediate output of one section of the whole system. For example, if it is desired to evaluate the performance of an error-correcting decoder in a modem, the input signal sampled could be the output of the demodulator; ie, it could include both the effects of distortion and noise in the received signal as well as the errors introduced by the demodulator section.

While many different parameters representative of input and output signal quality can be employed, it will be desirable to select those which are most appropriate to the signal and signal-processing device concerned. For example, S/N or IBAD (in-band amplitude dispersion) are likely to be appropriate measures of both input and output signal quality of an IF stage of a receiver (an A-A device), while an error count or BER will be better suited to the input and output of a digital decoder (a D-D device). For an A-D device, IBAD, S/N, or GD (group delay) would be suitable to measure input signal quality, while error-count or BER would be suitable as the measure of output signal quality. Equipment having a digital output will often have a built-in error correction system capable of generating an error-count, BER or some other indicator of output signal quality, but few will be able to provide a measure of input signal quality. If such measures are not available, they will need to be derived by the analyser. For example, a valuable method of characterising the quality of a modulated carrier signal subject to multi-path fading (using an IBAD-type measure) was disclosed in Australian patent No. 576245 granted to the Australian Telecommunications Commission with the title "Radio Signal Quality Monitor".

DETAILED DESCRIPTION OF THE PREFERRED EMBODIMENTS

Having broadly portrayed the nature of the present invention, particular embodiments will now be described by way of example and illustration only. In the following description, reference will be made to the accompanying drawings in which.

Figure 1:
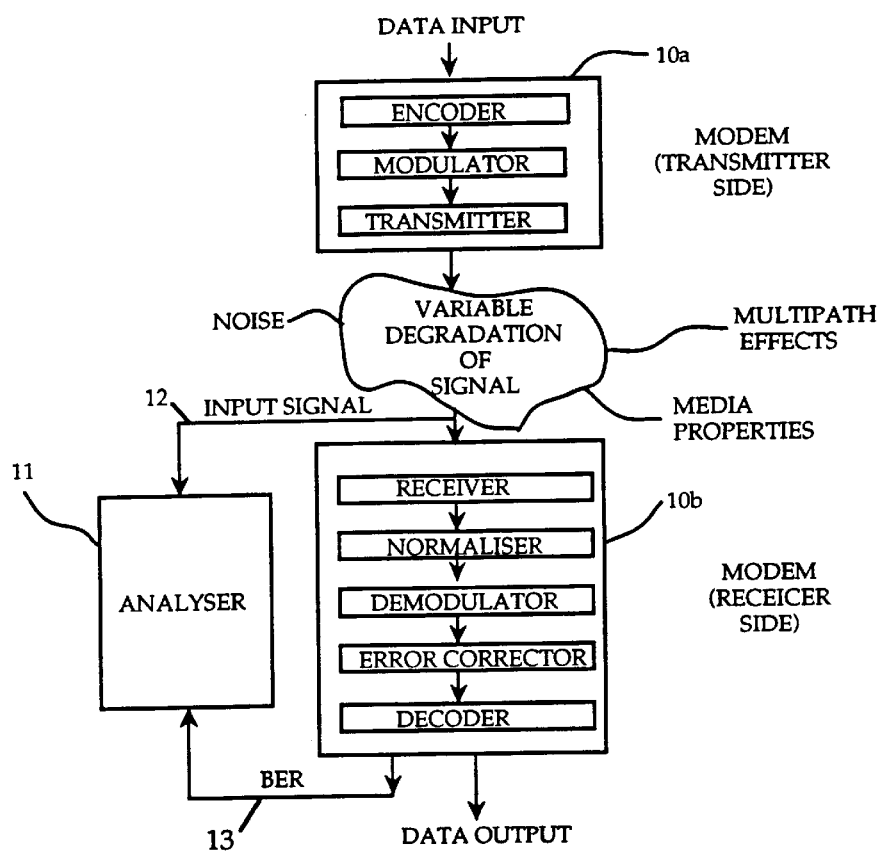
FIG. 1 is a block diagram of a signal-processing system employing a high-performance (16 QAM) radio system in which the receiver side is undergoing evaluation or calibration.
Figure 4A:
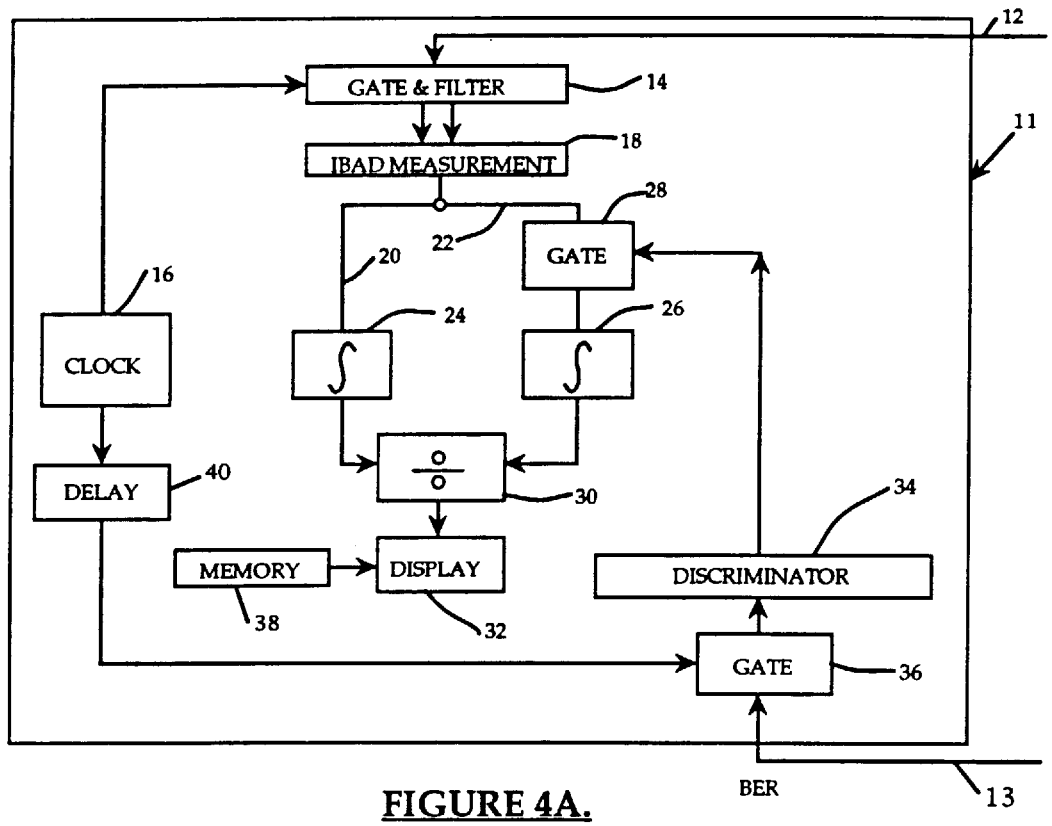
Figure 4B:
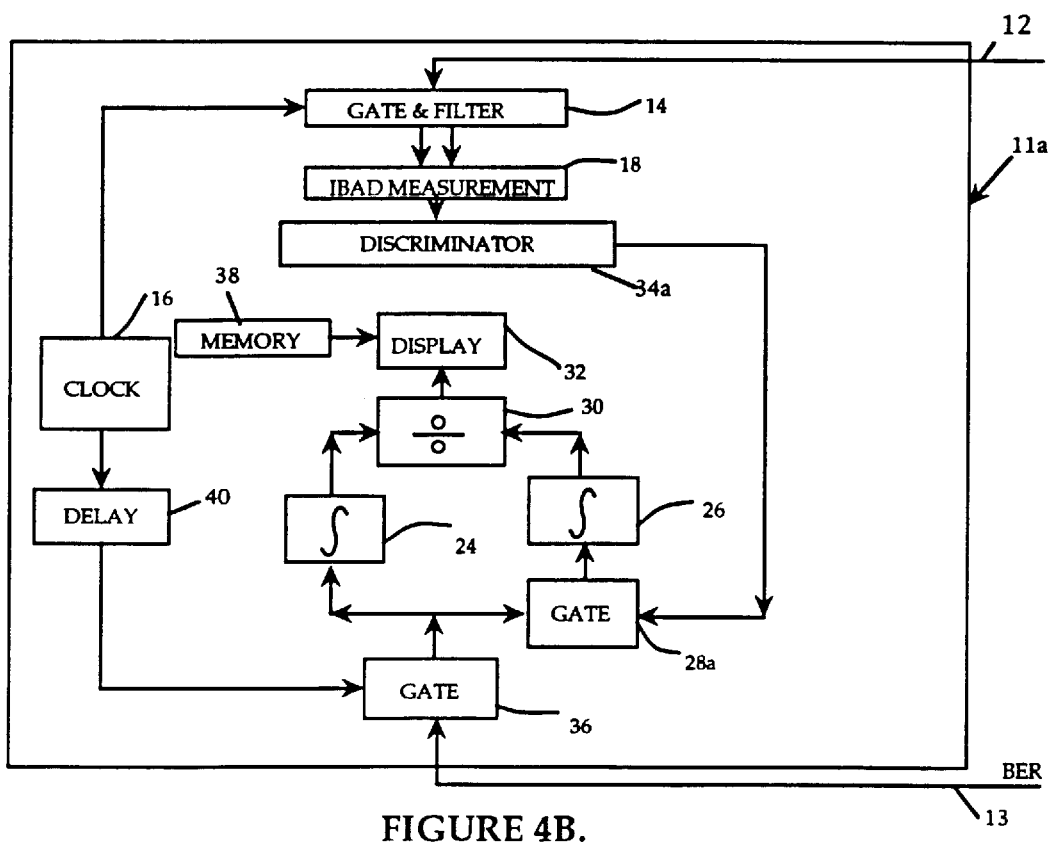
Figure 4C:
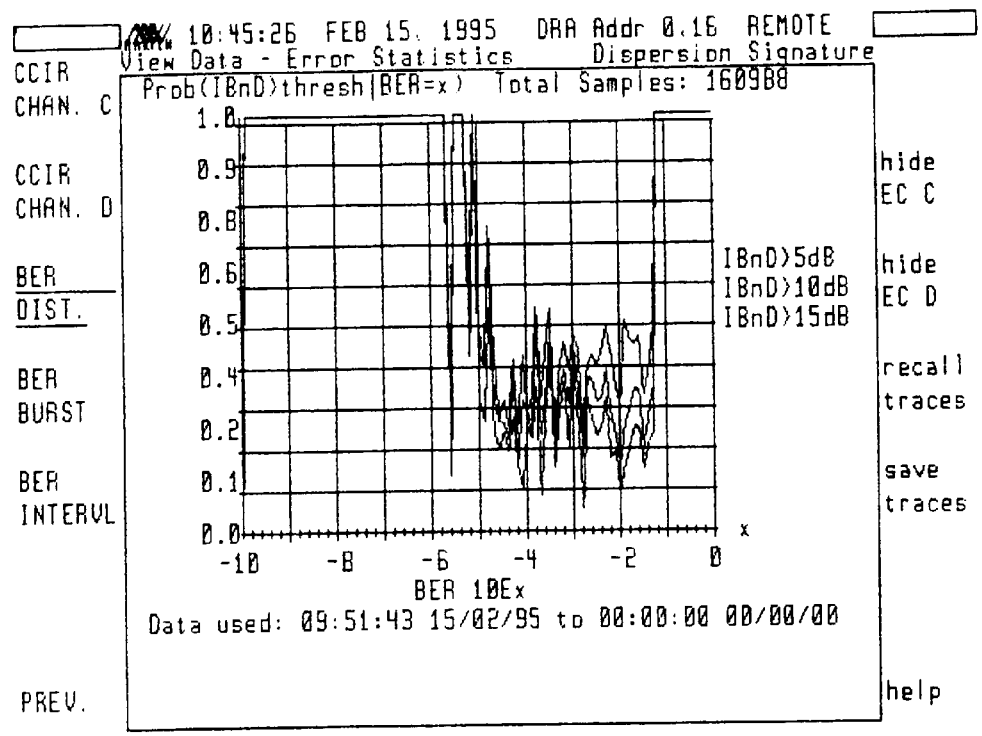
Figure 4D:
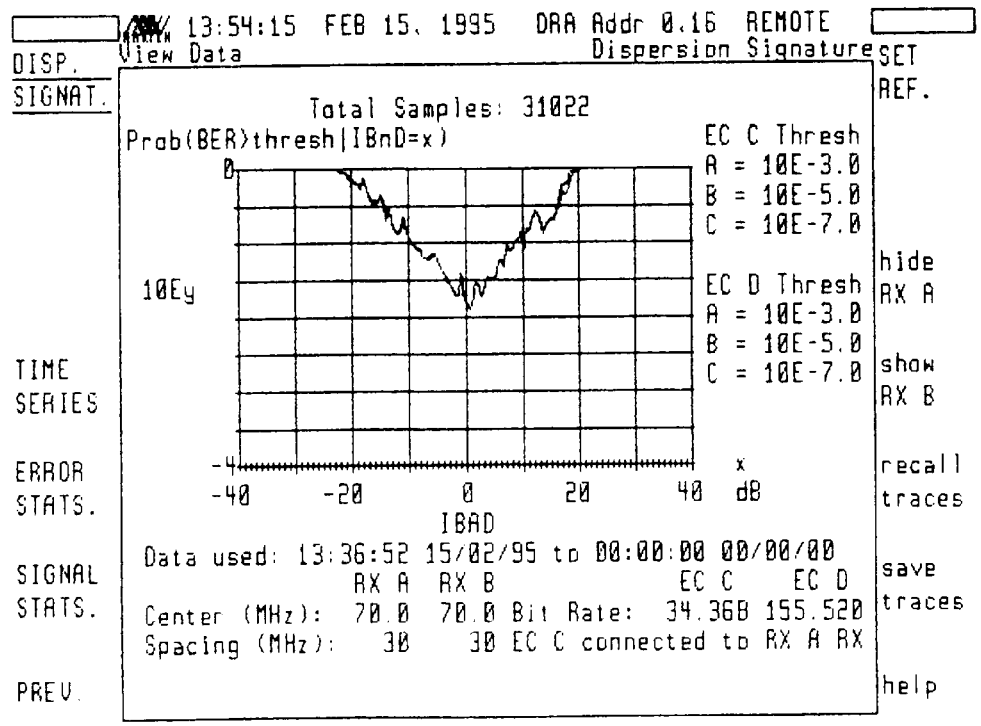

FIG. 4A is a block circuit diagram of the analyser of FIG. 1 where the select profile is formed from input signal quality measurements according to an output threshold; FIG. 4B is a reconfiguration of the circuit of FIG. 4A to allow the select profile to be formed from output quality measurements according to an input threshold; FIGS. 4C and 4D are screen-captures of normalised select probability profiles generated from the systems of FIGS. 4B and 4A respectively.

Figure 5:
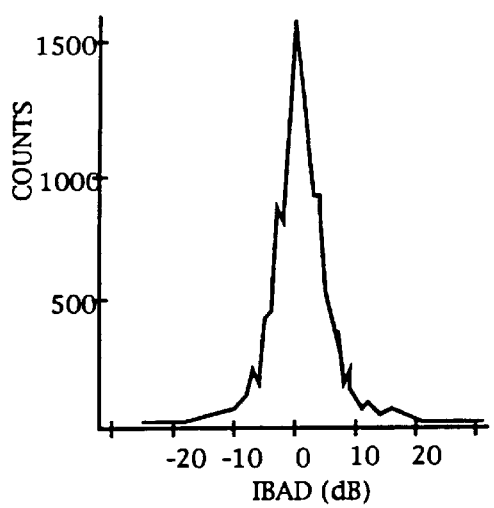

FIG. 5 is a graph illustrating the overall frequency profile generated by the analyser of FIG. 1.

Figure 6:
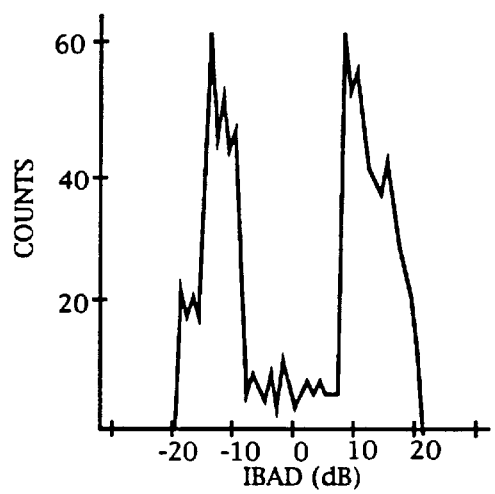

FIG. 6 is a graph illustrating the select frequency profile generated by the analyser of FIG. 1.

Figure 7:
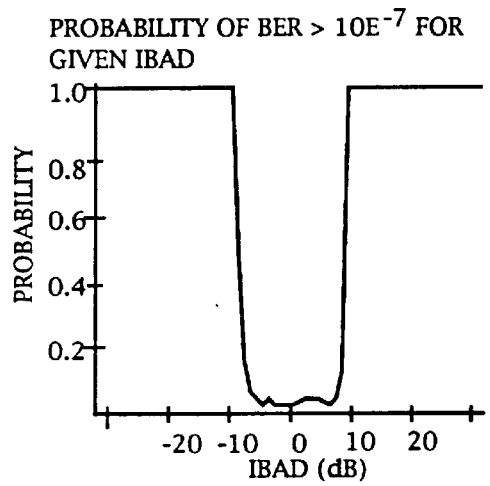

FIG. 7 is a graph illustrating the select probability-profile generated by the analyser of FIG. 1.

Figure 8:
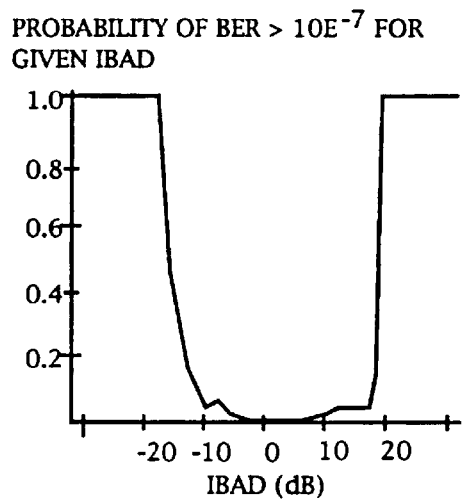

FIG. 8 is the select probability-profile for a reference modem using the same criteria as for FIG. 7.

Figure 9:
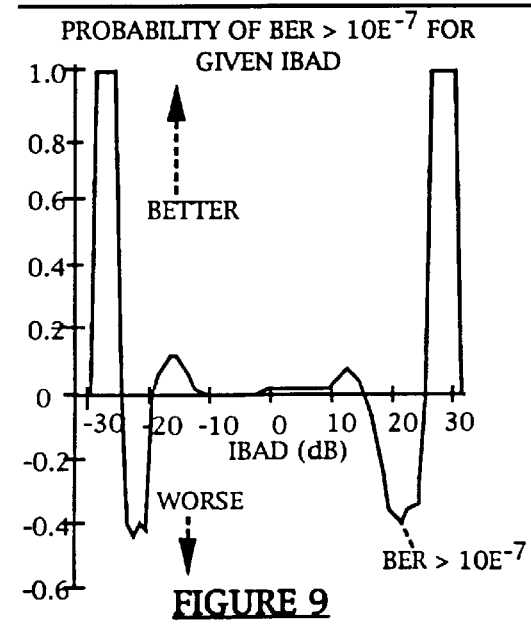

FIG. 9 is the composite probability-profile resulting from differencing the test and reference profiles of FIGS. 7 and 8.

Figure 10:
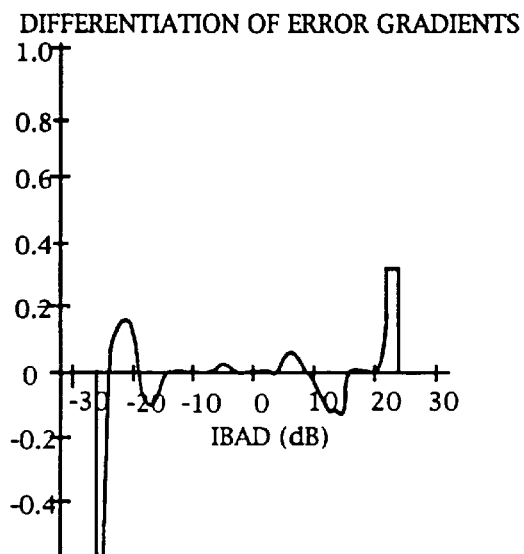

FIG. 10 is a modified composite probability-profile resulting from differentiating error gradients in the graph of FIG. 9.

Figure 11:
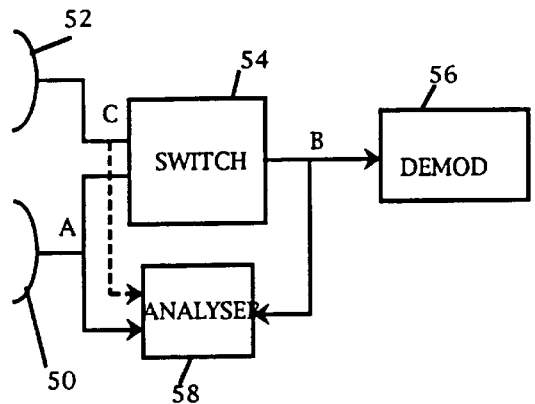

FIG. 11 is a block diagram of a space-diversity combiner switch under evaluation.

Figure 12:
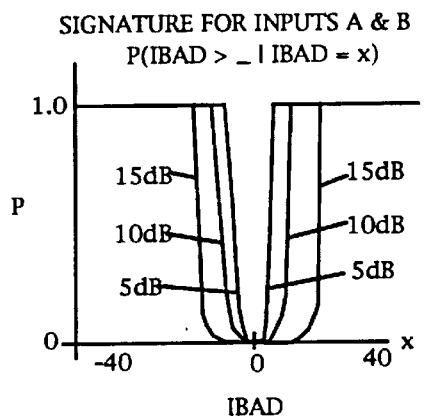
Figure 12:
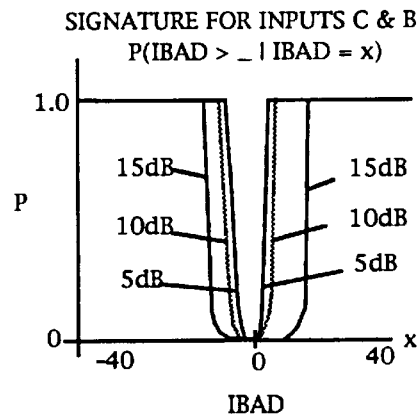
Figure 12:
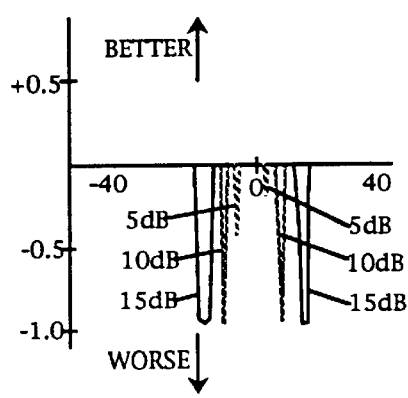
Figure 12:
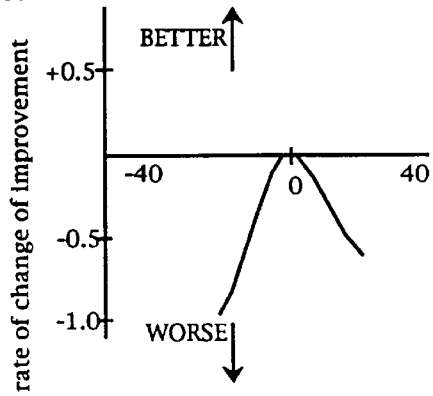
Figure 13:
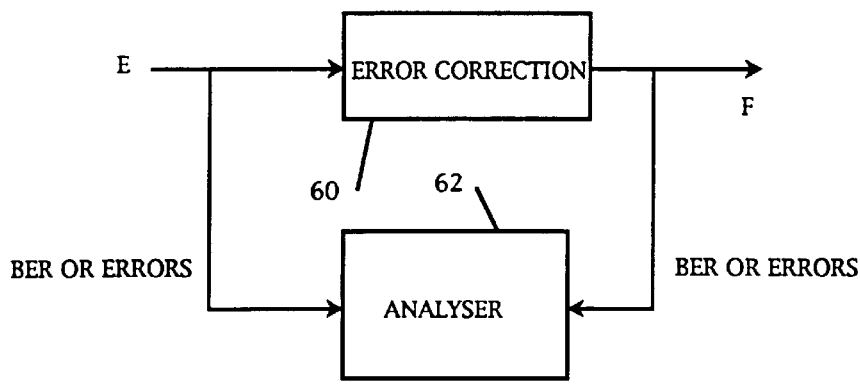
Figure 12E:
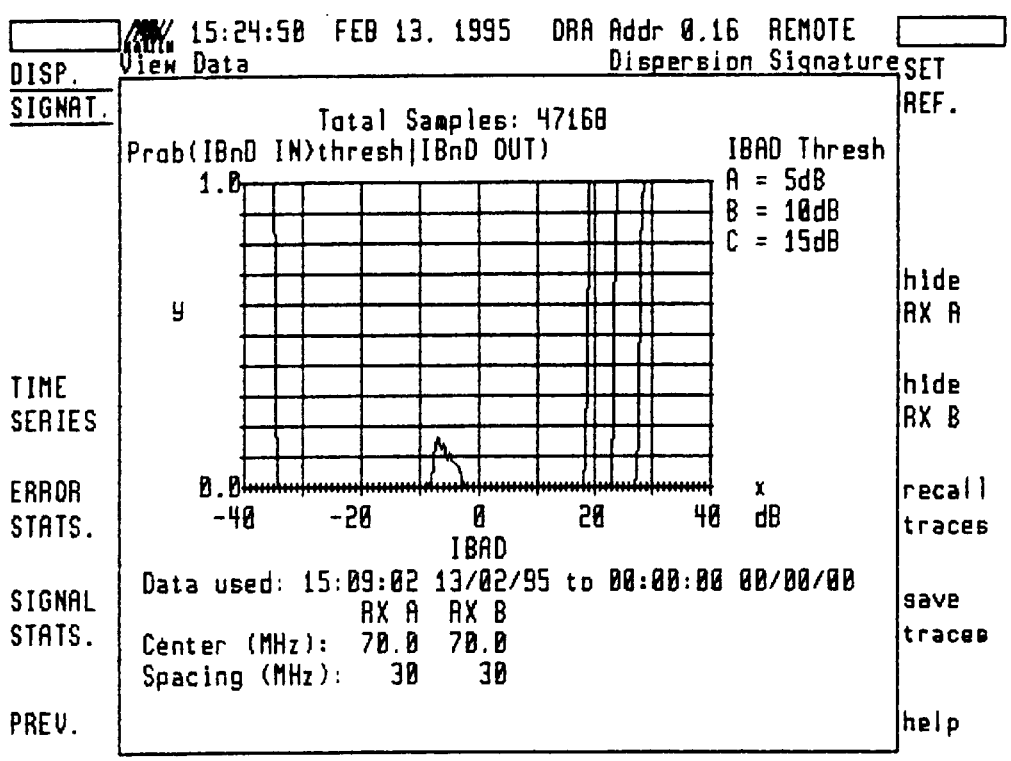

FIGS. 12A to 12E are graphs of various profiles derived from the circuit of FIG. 13, FIG. 12E being a screen-capture of an actual display.

FIG. 13 is a block diagram of a digital error-correcting device under evaluation.

FIGS. 14A to 14D are various profiles derived from the circuit of FIG. 13

The radio (microwave) communications link illustrated in FIG. 1 employs a digitally-encoded 16 QAM modulation system using high-performance modems. Data is input into the transmitter-side modem 10a and, after encoding, modulation and transmission over a microwave link is received, demodulated and decoded by a receiver-side modem 10b. This modem includes a receiver, a signal-normaliser (including systems for automatically compensating for signal distortion and fade), a demodulator for extracting the digital signal, and, digital error detection and error correction systems which may rely upon the inclusion of checksums or parity-bits in the data-stream. In this example, it is assumed that the error-correction circuit of modem 10b has a BER output to indicate the quality of its output signal. To evaluate the performance of modem 10b, an analyser 11 formed in accordance with this invention is connected to receive, via a first input line 12, the analogue radio signal input into modem 10b and, via a second input line 13, the BER output of modem 10b.

It will be appreciated that, when connected as shown, the analyser 11 will be evaluating the total A-D signal-processing system on the receiver side. If analyser 11 were connected only across the receiver and/or the normalisation circuits of modem 10b, it would be evaluating an A-A signal-processing sub-system only. Or, if it were connected across the error correction and/or decoder circuits, it would be evaluating the performance of a D-D signal-processing sub-system. Connection across the demodulator only would again involve the evaluation of an A-D system.

Figure 2:
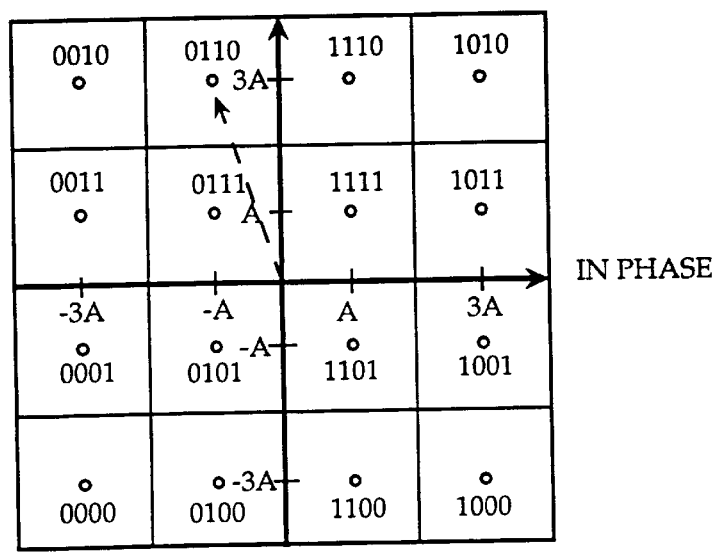
FIG. 2 is a constellation diagram of a 16-QAM modulation system.

FIG. 2 illustrates a typical constellation diagram of signal/data points for a 16-QAM modulation system. In such a system, the receiver/demodulator must be able to decide at any instant in which cell the signal falls by determining the amplitude of the in-phase and quadrature carriers at that time. Thus, if the amplitude of the quadrature carrier is 3A and the amplitude of the in-phase carrier is −A, the signal will correspond to the digital data point or byte 0110 (as shown by the arrow). If the received and demodulated signal is plotted on such a grid over some time, internally or externally generated noise will have the effect of changing the sharp well-defined signal points into fuzzy or diffuse areas which may overlap neighbouring grid zones, the density and spread of each area being indicative of the probability of interpretation error at that data point. If it is assumed that noise affects both carriers in the same way (ie, the noise is 'double-sided'), the effect of noise can be calculated and plotted as the probability of output error against double-sided input S/N for various QAM systems. [See, for example, FIG. 6.28 in the textbook, "Digital Line of Sight Radio Links: A Handbook" by Townsend, published by Prentice Hall in 1988.]

The determination of the probability of error is, of course, much more complicated: the noise may not be double-sided so error-probability will not be uniform across the constellation grid; phase and amplitude distortion in the signal will skew the set of signal points with respect to the grid and will usually distort the grid itself; and, there may be a fixed or variable misalignment of the transmitter/modulator and the receiver/demodulator grids.

Nevertheless, for acceptable operation, 16 QAM modems are expected to have a Pe better than $10^{-13}$ (corresponding to a S/N ratio of about 24.5 dB) and, preferably, better than $10^{-14}$, taking into account the combined effects of noise, distortion and modem calibration error. To meet such specifications, modem manufacturers must calibrate or pre-set each modem by a lengthy trial and error measurement and adjustment procedure. For the low Pe levels indicated, this procedure can take days because of the need to accumulate counts of rare errors. Any error of judgment in deciding which calibration variable to tweak, or in deciding the right direction in which it should be tweaked, thus greatly prolongs calibration time. After calibration, the constellation grid of the receiver-side of the modem will be aligned with that of the transmitter-side, the normalisation system will operate to compensate for signal fades (within specified levels) and the digital error correction systems will work so that, in combination, the result will be a modem that performs within specification.

Figure 3:
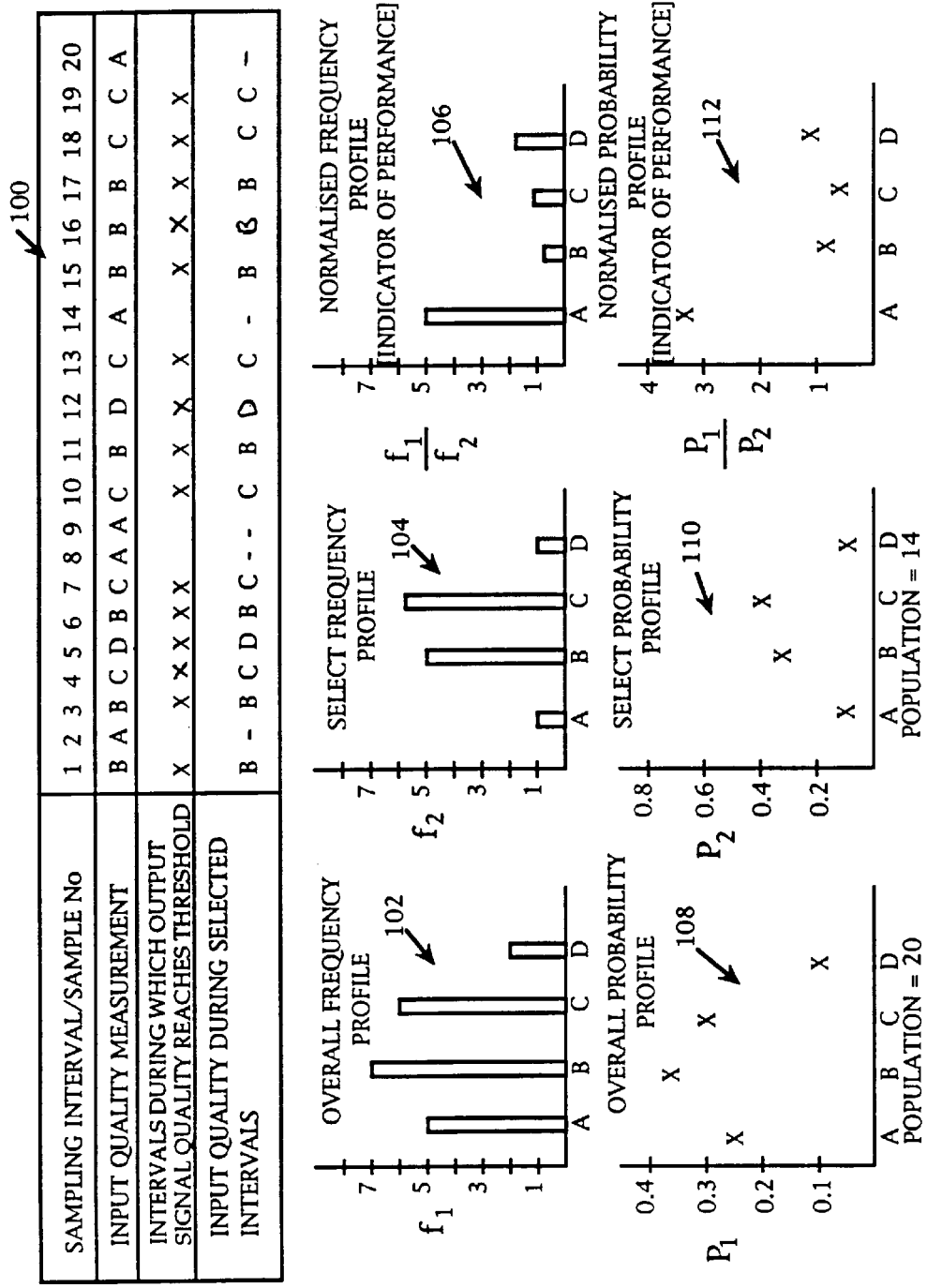
FIG. 3 is a diagram illustrating, in greatly simplified form, the manner in which select frequency and probability-profiles can be derived from input and output signal quality data.

FIG. 3 provides, in a simplified and diagrammatic form, an indication of two methods of evaluating the performance of a modem or other signal processing device in accordance with the principles of the present invention. More realistic profiles involving thousands of data-points and at least 100 increments signal quality are provided in later Figures. The tabulation 100 of FIG. 3 shows four increments (A, B, C and D) of sampled first-input signal quality and the frequency with which each occurs over the whole population of 20 samples. Thus, the overall frequency profile can be represented by graph 102. Assuming the predetermined threshold of second-input signal quality to be B (that is, only level A is excluded) the 'select' intervals during which the second-input signal quality reaches or passes this threshold are indicated by X. The values of the measurements of first-input signal quality for these select intervals are indicated on the last line of tabulation 100 and can be represented as the select frequency profile of graph 104. To adjust or normalise the select profile with respect to the overall profile, the count for each of its increments is divided into the count for the same increment of the overall profile to generate the normalised select profile of graph 106, which provides a useful indicator of modem performance. Alternatively, the twenty first-input signal quality samples can be arranged in an overall probability-profile (graph 108), the selected measurements of first-input signal quality can be represented by a select probability-profile (graph 110) which can again be normalised by division (increment by increment) to yield the normalised profile of graph 112, which also serves as a useful indicator of device performance. It will be appreciated that similarly useful normalised profiles might be produced by dividing the select profiles by the overall profiles or by subtracting them from the overall profiles.

If it is desired to determine whether and to what degree the modem or other device under test meets its performance specification, its normalised select frequency or probability profile can be easily and quickly compared (in a graphical display) with similar profiles obtained using the same quality parameters and threshold from a device which is known to perform within specification. Instead of days to collect sufficient errors to make enough Pe estimates to allow just one parameter of a high-capacity high-performance modem to be optimised, the use of this type of test and calibration system can allow complete calibration of high-capacity 16 or 256 QAM modems in a matter of minutes. This is because the approach adopted is essentially comparative (comparing the test modem profile to the stored profile taken from a reference modem) rather than absolute. Moreover, it provides a guide to indicate which way and by how much a given test calibration variable should be tweaked in order to minimise the difference between the reference and test profiles; it also provides an immediate indication if an adjustment has led to an unexpected change in relative performance. As the method is statistical, the test profile is built up over time and it is easy to observe whether successive samples are converging or not; if so, the next adjustment can be made, again greatly shortening the average time per adjustment. It should be noted, however, that it will normally be desirable to generate the reference profile from a modem that has been exhaustively tested, calibrated and aligned in the conventional manner so that it conforms comfortably to its stated performance specifications.

This approach also allows the calibration process for a high-capacity modem to be automated. For example, the reference profile can be stored in memory within the modem as a look-up table together with the optimal adjustment sequence, and the input and output error rates of the modem (or of a drift-sensitive sub-circuit thereof) can be continuously monitored by a dedicated in-built analyser. When the performance of the modem falls outside specification, a built-in calibration procedure can be instituted while the modem remains in service or, if desired, while it is switched out of service. Known adaptive or heuristic algorithms may be employed to determine the sequence of adjustments in the last stages of the calibration process. In any event, the profile of the test modem is recorded, and at the outset and after every adjustment, compared with the stored reference profile derived from the standard modem, appropriate adjustment is computed, and a new measurement and adjustment sequence started. This will be of value for the inservice checking of modems in the field. Indeed it can be employed to provide a measure of the probability of data loss in a transmission path between transmitter and receiver, as the field-generated profile can be used instead of the laboratory profile generated during the calibration procedure.

Referring now to FIG. 4A, which shows analyser 11 of FIG. 1 in block diagram form, first-input signal on line 12 (being the input to modem 10b) is led to a gate and filter 14 which is controlled by a clock 16 to sample the signal spectrum at two widely spaced narrow frequency bands at about 10 times a second. The two resultant output signals for each sample are fed to a circuit 18 which determines the IBAD of each sample in 0.5 dB increments, these measurements being directed by lines 20 and 22 to accumulators (or integrators) 24 and 26 respectively. Accumulator 24 counts the number of samples falling in each increment of signal quality for all samples so that the overall signal frequency or count profile is built-up in accumulator 24. Accumulator 26 similarly counts samples falling in each increment of first-input signal quality, but gate 28 is opened only when the quality of the second-input (on line 13) falls within the predetermined range so that the select profile is built-up in accumulator 26. The outputs of accumulators 24 and 26 are fed to a normalising circuit 30 which generates the normalised select profile and outputs it to computer monitor 32 and/or to computer memory 38 so that it can be displayed and/or stored, alone or with a reference profile also stored in memory 38.

Gate 28 is operated from a discriminator 34 that is connected to second-input 13 (comprising the BER output of the modem 10b) via a sampling gate 36 that is operated by clock 16 in synchronism with gate/filter 14. In the event that there is significant delay of the signals through modem 10b, a delay circuit 40 is incorporated in the clock line to the gate 36 so that each sample of the first-input signal corresponds to each respective sample of the second-input signal.

In this example, the contents of accumulators 24 and 26 may be conceived of as histograms or frequency profiles which allocate sample counts to IBAD increments over the range of first-input signal variation during the test period. For example, if the range of possible IBAD values is +30 dB to −30 dB and 0.5 dB increments are employed, each accumulator will accumulate or integrate counts of signal quality for each of the 120 increments. Gate and filter 14 and the IBAD measurement circuit 18 are of types known in the art, such as disclosed in our aforementioned PCT patent application. Integrators 24 and 26 may be registers or accumulators within a microprocessor or microcomputer, each capable of accumulating a separate count for each IBAD increment. Clock 16 may comprise the clock of such a microprocessor, while display 32 and memory 38 may be components of a microcomputer. It is therefore convenient to implement the remainder of the functional elements of the analyser 11 in software running on such a microcomputer.

FIG. 4B shows how the elements of analyser 11a may be configured to generate profiles of measurements of output signal quality (BER) with respect to an input signal quality (IBAD) threshold. For consistency, it will be taken that the input signal to modem 10b comprises the second-input to analyser 11a (via line 12). This input is fed to gate and filter 14 controlled by clock 16, and from gate 14, to an IBAD measurement circuit 18 but, in this case, the IBAD measurements are fed to discriminator 34a which controls gate 28a according to whether the IBAD measurements reach a predetermined fall within a predetermined range. As before, clock 16 controls a gate 36 via a delay circuit 40 to ensure that the first-input to analyser 11a on line 13 (ie, the BER output of modem 10b) is sampled at equivalent times to the corresponding samples of IBAD at gate 14. The BER samples are accumulated (according to their appropriate increments) in accumulators 24 and 26 to generate the overall and select profiles, respectively. As before, the select profile is normalised by circuit 30 and fed to display 32 and/or to memory 38.

Much of this process and some of the circuit elements can be implemented in software. FIG. 4C is a screen-capture of a family of BER/IBAD profiles as might be generated by the system of FIG. 4B using the criteria: Prob. (IBAD>threshold|BER=x) for IBAD threshold values of 5 dB, 10 dB and 15 dB. A Digital Radio Analyser Model M150-RR manufactured by the applicant using the BER/IBAD program listing of Appendix 1 was employed. The normalised probability profiles shown suggest that the device under test has a variable response at BER values between $10E^{-6}$ and $10E^{-1}$. FIG. 4D is a screen-capture of a family of IBAD/BER profiles as might be generated by the system of FIG. 4A using the criteria: log(Prob (BER>threshold|IBAD=x)) for BER threshold values of $10E^{-3}$, $10E^{-5}$ and $10E^{-7}$. A Digital Radio Analyser Model M150-RF manufactured by the applicant was employed using the program listing of Appendix 2. It will be seen that, in FIG. 4D, the probability values (Y axis) are displayed in logarithmic form to emphasise low probability values.

The steps by which such profiles may be generated with the apparatus of FIG. 4A is shown in simplified form by FIGS. 5 to 10. FIGS. 5 and 6 represent (respectively) the overall and select frequency (count) profiles accumulated by integrators 24 and 26, the select profile of FIG. 6 resulting from the counts of input signal quality where the modem BER was greater than $10E^{-7}$. FIG. 7 shows the equivalent normalised select probability profile (for BER>$10E^{-7}$), while FIG. 8 shows the same profile for a reference modem. FIG. 9 is the composite profile generated by differencing the profiles of FIGS. 7 and 8, excursions above and below the X-axis indicating areas of relatively superior or inferior performance of the test modem with respect to the reference modem. In practice, families of profiles like that of FIG. 4C would be generated and compared, allowing differentiation of gradients to provide an even more informative composite profile schematically shown in FIG. 10, showing test modem performance better than the reference at the extremities of distortion (>28 dB and <−25 dB), particularly at high error rates. These regions will normally be those where carrier-synchronisation is lost or reacquired. For low error rates, when the modem is 'in-lock', the processing effectiveness of the test modem is worse than the reference modem, particularly at distortion values between 18 and 28 dB and at −14 to 25 dB. At lower distortions (between 0 and 18 dB and between 0 and −14 dB), the modem performs better than the reference.

The techniques disclosed herein may be applied to switching devices (for digital or analogue signals) as well as to the continuous-signal systems described so far. A technique for minimising errors due to multi-path fading in radio transmission, known as 'space diversity combination' uses multiple antennae for reception. This is illustrated schematically in FIG. 11. The signal quality from each antenna 50 and 52 is monitored continuously by a switch or combiner circuit 54 which selects the input with the highest quality signal (usually determined by a measure of amplitude distortion) for transmission to the demodulator 56. Here the analyser 58 of the present invention is connected across switch 54 and the input A from antenna 50 while test signals are fed to both antennas, the analyser 58 sampling and measuring the IBADs (say) of both input A and output B of switch 54. FIG. 12A shows a family of normalised select probability-profiles generated using input A and output B. FIG. 12B shows the same family of probability-profiles generated for input C from antenna 52 and switch output B. FIG. 12C shows the composite profiles generated by differencing those of FIGS. 12A and 12B to highlight the specific regions of low relative performance, while FIG. 12D shows the difference of gradients in the composite profiles of FIG. 12C for all the threshold values—providing a simple and clear indication that combiner switch 54 is unable to handle a degraded signal in antenna 52 (feedline C). A screen capture of a family of three select probability-profiles (for output thresholds of 5 dB, 10 dB and 15 dB) similar to the profile of FIG. 12A is provided by FIG. 12E. This was generated by Digital Radio Analyser Model DRA-M150-RR manufactured by the applicant using the program listing of Appendix 3. It shows that the device has asymmetry between the response at −35 dB and those at 18 dB (5 dB threshold), 22 dB (10 dB threshold) and 27 dB (15 dB threshold), the responses for all thresholds coinciding at −35 dB. The response between −3 dB and −8 dB appears to be spurious.

Figure 14:
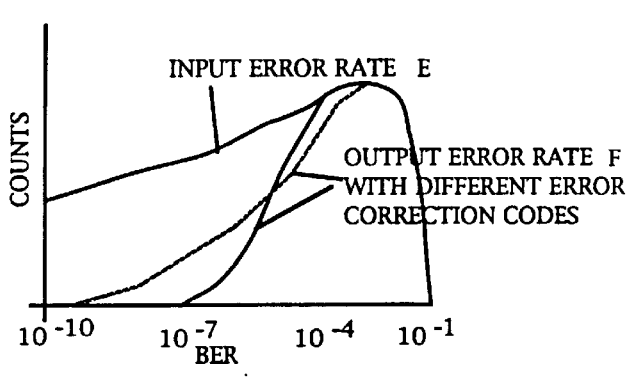
Figure 14:
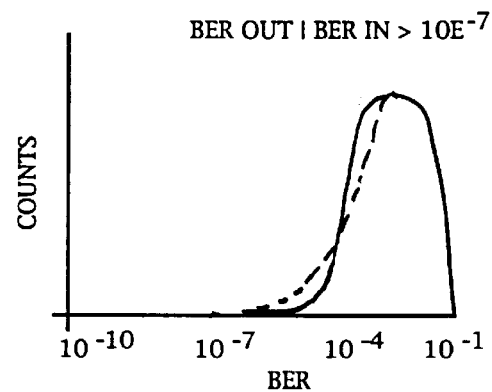
Figure 14:
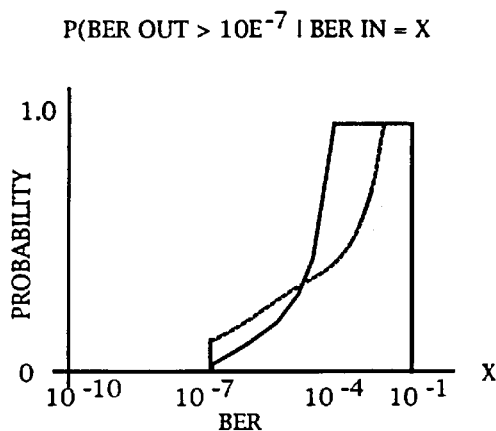
Figure 14:
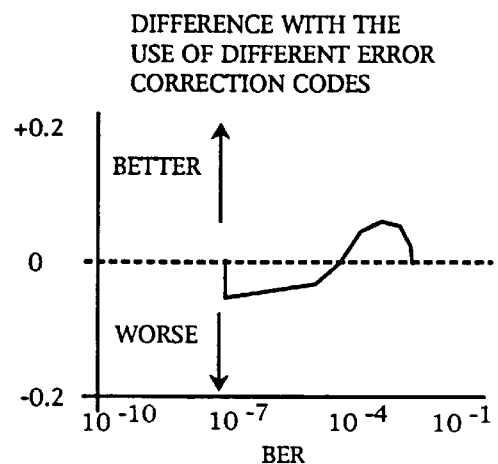

FIGS. 13 to 14D illustrate the use of the analyser (62) of this invention for evaluating the performance of a digital error-correction system 60 (FIG. 13), in which BER measurements are available for both the input E and the output F of device 60. FIG. 14A shows (superimposed) the input and output BER counts for two different error correction codes applied (in separate tests) by device 60. FIG. 14B shows the corresponding select frequency profiles for each code (again superimposed) for an output BER threshold of $10E^{-7}$; FIG. 14C showing the corresponding probability-profiles. Again, differentiation of differential gradients in FIG. 14C result in a simple and clear representation of the relative performance of the two error codes, as shown in FIG. 14D. It might be noted that the asymmetric character of these profiles is due to the nature of the BER measure, which does not have a negative dimension like dB or IBAD.

APPENDIX 1: BER/IBAD

```
/* Dispersion signatures */
/* Set data and operational status's as required.
EC C is the conditional digital input, RX A is switched depending
on the following IBAD thresholds:
>5dB, >10dB, >15dB */ if (initialized_data->dym_anal_modes[(index_t )ERROR_STATS] == DB_ENABLED) {
    /* do ccir */

(void)UpdateCCIR(initialized_data, BER_count_read_c, BER_count_read_d);

/* Adjust counts if threshold exceeded at the gate input */
    if (adjust_count_c)
        BER_count_read_c =
            BER_count_read_c * initialized_data->sample_rate;

if (adjust_count_d)
        BER_count_read_d =
            BER_count_read_d * initialized_data->sample_rate;

/* BER distribution */
    /* Unconditional */
    if (initialized_data->ec_op_status[EC_C] == DB_ON) {
        if (BER_count_read_c == 0)
            bin = 0;
        else {
            BER_ratio_av = (float_t)(BER_count_read_c)/
                ((float_t)initialized_data->bit_rate_a);
            bin = 10 * log10(BER_ratio_av * 1000000000.0) + 10;
            /* if this is changed, change bin numbers for "good" factors */
        }

/* inc unconditional histogram */
        if ((error = DbHistInc(ES_DATA, ES_DIST_DATA, UNCONDITIONAL, bin))
            < SUCCESS){
            _WARNING(Log_Error(DRA,TRANSIENT,506,__FILE__,__LINE__,
            "WARNING: EC C sample out of range"));
        }
    }

/* Inc conditional BER distribution if above threshold */
    for (ec_index = 0;ec_index < 3;ec_index++) {
        if (IBnD_read[RX_A] > IBAD_thresholds[ec_index])
            IBAD_above_thresh[ec_index] = TRUE;
        else
            IBAD_above_thresh[ec_index] = FALSE;
    }
```

```
       for (ec_index = 0;ec_index < 3;ec_index++) {
    if (IBAD_above_thresh[ec_index]) {
        if (ec_index == 0) {
            if ((error = DbHistInc(ES_DATA, ES_DIST_DATA, COND_1, bin))
                < SUCCESS){
                _WARNING(Log_Error(DRA,TRANSIENT,506,__FILE__,__LINE__,
                "WARNING: EC C sample out of range"));
            }
        } else if (ec_index == 1) {
            if ((error = DbHistInc(ES_DATA, ES_DIST_DATA, COND_2, bin))
                < SUCCESS){
                _WARNING(Log_Error(DRA,TRANSIENT,506,__FILE__,__LINE__,
                "WARNING: EC C sample out of range"));
            }
        } else {
            if ((error = DbHistInc(ES_DATA, ES_DIST_DATA, COND_3, bin))
                < SUCCESS){
                _WARNING(Log_Error(DRA,TRANSIENT,506,__FILE__,__LINE__,
                "WARNING: EC C sample out of range"));
            }
        }
    }
}/* for loop */

/* build the trace buffer data ready for display */ if ((total_samples > 0) &&
        (init_data->dym_analysis_mode == ERROR_STATS)) {
    if (buffer_p == NULL) {
        /* send the data to the handler */
        sprintf(buffer, "D,%d,%-7u^", SMPL_BASE, total_samples);
        SendBuffer(buffer, channel, screen_no);
    }

/* update traces */
    /* read unconditional buffer */
    if ((error = DbHistRead(ES_DATA, ES_DIST_DATA,
        UNCONDITIONAL, WHOLE_RECORD, (void **)(&u_buf)))< SUCCESS){
        Log_Error(DRA,TRANSIENT,623,__FILE__,__LINE__,
        "Database read failed %s", StrReturn(error));
        SuspendTask();
    }
    for (ec_index = 0; ec_index < 3; ec_index++) {
        u_buf_p = u_buf;
        /* read conditional buffers */
        if (ec_index == 0) {
            if ((error = DbHistRead(ES_DATA, ES_DIST_DATA,
                COND_1, WHOLE_RECORD, (void **)(&c_buf)))< SUCCESS){
                Log_Error(DRA,TRANSIENT,623,__FILE__,__LINE__,
                "Database read failed %s", StrReturn(error));
                SuspendTask();
            }
        } else if (ec_index == 1) {
            if ((error = DbHistRead(ES_DATA, ES_DIST_DATA,
                COND_2, WHOLE_RECORD, (void **)(&c_buf)))< SUCCESS){
                Log_Error(DRA,TRANSIENT,623,__FILE__,__LINE__,
                "Database read failed %s", StrReturn(error));
                SuspendTask();
            }
        } else {
            if ((error = DbHistRead(ES_DATA, ES_DIST_DATA,
                COND_3, WHOLE_RECORD, (void **)(&c_buf)))< SUCCESS){
                Log_Error(DRA,TRANSIENT,623,__FILE__,__LINE__,
                "Database read failed %s", StrReturn(error));
                SuspendTask();
            }
        }
```

```
        c_buf_p = c_buf;
        /* calculate dispersion sig */
        if (buffer_p == NULL) {
            sprintf(buffer, "G,0,%d,0", ec_index);
        } else {
            sprintf(buffer, "G,0,%d,0", ec_index+3);
        }
        for (i = 0; i < ES_BIN_MAX; i++,c_buf_p++,u_buf_p++) {
            if (*u_buf_p == 0) {
                sprintf(buf, ",1.0");

} else {
                /* divide by unconditional histogram */
                sprintf(buf, ",%1.3f",
                    (((float_t)(*c_buf_p))/((float_t)(*u_buf_p))) );
            }
            strcat(buffer, buf);
        }
        strcat(buffer, "^");
        if (buffer_p == NULL) {
            SendBuffer(buffer, channel, screen_no);
        } else {
            if (strlen(buffer) + strlen(buffer_p) < MAX_STORE_FILE_SIZE) {
                strcat(buffer_p, buffer);
            } else {
                Log_Error(DRA,TRANSIENT,6118,__FILE__,__LINE__,
                    "Exceeded max trace buffer size");
                strcpy(buffer_p, "");
                return;
            }
        }
    }
}
```

APPENDIX 2: IBAD/BER LOG PROFILE

```
/* Dispersion signatures */
/* Set data and operational status's as required.
EC C is normally connected to RX A only.
EC D is normally connected to RX B only.
EC C can also be connected to both RX A and RX B.
In this mode, EC D is ignored.
RX A can be connected to EC C or EC D. */
if (initialized_data->ec_c_rx == EC_RX_BOTH) {
    rx_both = TRUE;
} else {
    rx_both = FALSE;
} for (rx_index = 0, ec_index = 0;
    rx_index < initialized_data->hw_config.no_receiver;
        rx_index++, ec_index++) {
    if (initialized_data->ec_ds_mode != SELECT_EC_C) {
        /* always use D since only 1 RX */
        ec_index = 1;
    }
    if ((initialized_data->rx_op_status[rx_index] == DB_ON) &&
        (initialized_data->ec_op_status[ec_index] == DB_ON)) {
        bin = ((float_t)IBnD_read[rx_index]/(float_t)P_FACTOR -\
            IBnD_LEVEL_MIN_DB)/(float_t)IBnD_LEVEL_BIN_WIDTH_DB;

/* truncate IBnD values */
        if (bin < 0)
            bin = 0;
        else if (bin > IBnD_BIN_MAX)
            bin = IBnD_BIN_MAX;

_DEBUG(DBG_DATA, LogDebug(__FILE__,__LINE__,
```

```
            "IBAD for rx %d %d bin no %d",
            rx_index, IBnD_read[rx_index], bin));

/* inc unconditional IBAD */
    if ((error = DbHistInc(IBnD_DATA, UNCONDITIONAL,
        IBnD_HIST_ROW(rx_index+1), bin))
             < SUCCESS) {
         WARNING(Log_Error(DRA,TRANSIENT,500,__FILE__,__LINE__,
         "WARNING: RX %s sample out of range",
         (rx_index == 0) ? "B":"A"));
    }

/* inc conditional IBAD if above threshold */
    for (ber_index = 0;ber_index < NO_OF_BER_THRESH;ber_index++) {
        if (BER_above_thresh[ec_index][ber_index]) { if ((error = DbHistInc(IBnD_DATA, ber_index+1,
                IBnD_HIST_ROW(rx_index+1), bin)) < SUCCESS) {
                 WARNING(Log_Error(DRA,TRANSIENT,501,__FILE__,__LINE__,
                 "WARNING: RX %s sample out of range",
                 (rx_index == 0) ? "B":"A"));
            }
        }
    }
}

/* if using both receivers with one EC, don't inc ec index */
if (rx_both)
    ec_index--;

}/* for loop */

* build the trace buffer data ready for display */ if ((total_samples > 0) &&
    (init_data->dym_analysis_mode == ERROR_STATS)) {
if (buffer_p == NULL) {
    /* send the data to the handler */
    sprintf(buffer, "D,%d,%-7u^", SMPL_BASE, total_samples);
    SendBuffer(buffer, channel, screen_no);
}

/* update traces */
if (init_data->ec_c_rx == EC_RX_BOTH) {
    rx_both = TRUE;
} else {
    rx_both = FALSE;
} init_line = 0;
for (rx_index = 0, ec_index = 0;
        rx_index < init_data->hw_config.no_receiver;
        rx_index++, ec_index++) {
    if ((init_data->rx_op_status[rx_index] == DB_ON) &&
        (init_data->ec_op_status[ec_index] == DB_ON)) {
        /* read unconditional buffer */
        if ((error = DbHistRead(IBnD_DATA, UNCONDITIONAL,
            IBnD_HIST_ROW(rx_index+1), WHOLE_RECORD,
            (void **)(&u_buf)))<SUCCESS) {
```

```
            Log_Error(DRA,TRANSIENT,623,__FILE__,__LINE__,
                "Database read failed %s", StrReturn(error));
            SuspendTask();
        }
        for (ber_index = 0,line = init_line;
            ber_index < NO_OF_BER_THRESH;
            ber_index++, line++) {
            u_buf_p = u_buf;
            /* read conditional buffer */
            if ((error = DbHistRead(IBnD_DATA, ber_index+1,
                    _IBnD_HIST_ROW(rx_index+1), WHOLE_RECORD,
                        (void **)(&c_buf)))
                    < SUCCESS) {
                Log_Error(DRA,TRANSIENT,624,__FILE__,__LINE__,
                    "Database read failed %s", StrReturn(error));
                SuspendTask();
            }
            c_buf_p = c_buf;
            /* calculate dispersion sig */
            if (buffer_p == NULL) {
                sprintf(buffer, "G,0,%d,0", line);
            } else {
                sprintf(buffer, "G,0,%d,0", line+6);
            }
            for (i = 0; i < IBnD_BIN_MAX; i++,c_buf_p++,u_buf_p++) {
                if (*u_buf_p == 0) {
                    sprintf(buf, ",1.0");
                } else {
                    /* divide by unconditional histogram */
                    sprintf(buf, ",%1.3f",
                        log10((((float_t)(*c_buf_p))/
                            ((float_t)(*u_buf_p)))) );
                }
                strcat(buffer, buf);
            }
            strcat(buffer, "^");
            if (buffer_p == NULL) {
                SendBuffer(buffer, channel, screen_no);
            } else {
                if (strlen(buffer) + strlen(buffer_p) <
                    MAX_STORE_FILE_SIZE) {
                    strcat(buffer_p, buffer);
                } else {
                    Log_Error(DRA,TRANSIENT,6118,__FILE__,__LINE__,
                        "Exceeded max trace buffer size");
                    strcpy(buffer_p, "");
                    return;
                }
            }
        }
    }
    /* if using both receivers with one EC, don't inc ec index */
    if (rx_both)
        ec_index--;

init_line = 3;
} /* for loop */
}
```

APPENDIX 3: IBAD/IBAD PROFILE

```
static longword_t   IBAD_thresholds[3] = {
    5*P_FACTOR,
    10*P_FACTOR,
    15*P_FACTOR};

/* extract IBAD and IBPD */
if (initialized_data->rx_ibad_ibpd == IBAD_OPTION) {
    IBnD_read[RX_A] = raw_sample_buffer_p->rx1_ibad;
    IBnD_read[RX_B] = raw_sample_buffer_p->rx2_ibad;
} else {
    IBnD_read[RX_A] = raw_sample_buffer_p->rx1_ibpd;
    IBnD_read[RX_B] = raw_sample_buffer_p->rx2_ibpd;
}

/* Dispersion signatures */
/* Set data and operational status's as required.
RX A is the unconditional analog input, RX B is switched depending
on the following IBAD thresholds:
>5dB, >10dB, >15dB
NOTE: This code will only work for M150-RR (2 receivers) */

/* Get the appropriate bin number to put the current sample */
bin = ((float_t)IBnD_read[RX_A]/(float_t)P_FACTOR -\
    IBnD_LEVEL_MIN_DB)/(float_t)IBnD_LEVEL_BIN_WIDTH_DB;

/* truncate IBnD values */
if (bin < 0)
    bin = 0;
else if (bin > IBnD_BIN_MAX)
    bin = IBnD_BIN_MAX;

_DEBUG(DBG_DATA, LogDebug(__FILE__,__LINE__,
    "IBAD for rx A %d bin no %d", IBnD_read[rx_index], bin));

/* inc unconditional IBAD */
if ((error = DbHistInc(IBnD_DATA, UNCONDITIONAL,
        _IBnD_HIST_ROW(1), bin)) < SUCCESS) {
    _WARNING(Log_Error(DRA,TRANSIENT,500,__FILE__,__LINE__,
    "WARNING: RX A sample out of range"));
}

/* inc conditional IBAD if above threshold */
for (rx_index = 0;rx_index < 3;rx_index++) {
    if (IBnD_read[RX_B] > IBAD_thresholds[rx_index])
        IBAD_above_thresh[rx_index] = TRUE;
    else
        IBAD_above_thresh[rx_index] = FALSE;
}
for (rx_index = 0;rx_index < 3;rx_index++) {
    if (IBAD_above_thresh[rx_index]) {
        if ((error = DbHistInc(IBnD_DATA, rx_index+1,
            _IBnD_HIST_ROW(2), bin)) < SUCCESS) {
            _WARNING(Log_Error(DRA,TRANSIENT,501,__FILE__,__LINE__,
            "WARNING: RX B sample out of range"));
        }
    }
}

}/* for loop */
/* build the trace buffer data ready for display */
/* read unconditional buffer */
if ((error = DbHistRead(IBnD_DATA, UNCONDITIONAL,
    _IBnD_HIST_ROW(1), WHOLE_RECORD, (void **)(&u_buf)))<SUCCESS) {
    Log_Error(DRA,TRANSIENT,623,__FILE__,__LINE__,"Database read failed %s",
    StrReturn(error));
    SuspendTask();
```

```
}
for (rx_index = 0; rx_index < 3; rx_index++) {
    u_buf_p = u_buf;
    /* read conditional buffer */
    if ((error = DbHistRead(IBnD_DATA, rx_index+1,
        _IBnD_HIST_ROW(2), WHOLE_RECORD,(void **)(&c_buf)))
            < SUCCESS) {
        Log_Error(DRA,TRANSIENT,624,__FILE__,__LINE__,
            "Database read failed %s", StrReturn(error));
        SuspendTask();
    }
    c_buf_p = c_buf;
    /* calculate dispersion sig */
    if (buffer_p == NULL) {
        sprintf(buffer, "G,0,%d,0", rx_index);
    } else {
        sprintf(buffer, "G,0,%d,0", rx_index+3);
    }
    for (i = 0; i < IBnD_BIN_MAX; i++,c_buf_p++,u_buf_p++) {
        if (*u_buf_p == 0) {
            sprintf(buf, ",1.0");
        } else {
            /* divide by unconditional histogram */
            sprintf(buf, ",%1.3f",
                (((float_t)(*c_buf_p))/((float_t)(*u_buf_p))) );
        }
        strcat(buffer, buf);
    }
    strcat(buffer, "^");
    /* send the data to the screen for display */
    if (buffer_p == NULL) {
        SendBuffer(buffer, channel, screen_no);
    } else {
        if (strlen(buffer) + strlen(buffer_p) < MAX_STORE_FILE_SIZE) {
            strcat(buffer_p, buffer);
        } else {
            Log_Error(DRA,TRANSIENT,6118,__FILE__,__LINE__,
                "Exceeded max trace buffer size");
            strcpy(buffer_p, "");
            return;
        }
    }
}
}
```

I claim:

1. A method of evaluating the performance of a signal-processing device during a test period when an input signal is applied to the device and an output signal is generated thereby, the method comprising the steps of deriving for one of said input signal and said output signal a select profile of signal quality variation by increment of signal quality for time intervals in which the signal quality of the other of said input signal and said output signal falls within a predetermined range of values, and graphically representing said select profile as an indicator of device performance.

2. A method according to claim 1 including the step of normalising said select profile, increment by increment of overall quality of said one of said input signal and said output signal without regard to said predetermined range, to generate a normalised select profile as an indicator of device performance.

3. A method according to claim 2 wherein the select profile is a probability profile representing the likelihood that a measurement of the signal quality of said one of said input signal and said output signal will fall within a given increment of signal quality when the signal quality of said other of said input signal and said output signal falls within said predetermined range.

4. A method according to claim 1 wherein the select profile is a probability profile representing the likelihood that a measurement of the signal quality of said one of said input signal and said output signal will fall within a given increment of signal quality when the signal quality of said other of said input signal and said output signal falls within said predetermined range.

5. A method according to claim 1 for evaluating the relative performance of the device with respect to a similar reference device, including the steps of deriving the select profiles for each device, differencing or otherwise contrasting said profiles, and graphically representing the difference there between.

6. A method of evaluating the performance of a signal processing device during a test period, comprising the steps of:

applying an input signal to the device and generating an output signal therefrom, sampling a quality of said input and said output signal at regular intervals throughout the test period, generating a first overall profile of signal quality of one of said input signal and said output signal by accumulating counts of signal quality for each of a plurality of signal quality increments, generating a first select profile of the signal quality of said one of said input signal and said output signal by accumulating counts of signal quality for each of said plurality of signal quality increments for intervals in which the signal quality of the other of said input signal and said output signal falls within a predetermined range, and using said first select profile as an indicator of device performance.

7. A method according to claim 6 including the steps of:

generating an overall probability-profile from said first overall profile representing the likelihood that a measurement of the signal quality of said one of said input signal and said output signal will fall within a given increment of signal quality, generating a select probability-profile from said first select profile representing the likelihood that a measurement of the signal quality of said one of said input signal and said output signal will fall within a given increment of signal quality for intervals in which the signal quality of said other of said input signal and said output signal falls within a predetermined range, and using said select probability-profile as an indicator of device performance.

8. A method according to claim 7 including the steps of:

generating a normalised select profile by adjusting said first select profile or said select probability-profile, increment by increment, according to the respective counts or probabilities of said first overall profile or said probability-profile, respectively, and using said normalised select profile as an indicator of device performance, or as the basis for an indicator of device performance.

9. A method according to claim 8 wherein the adjustment of the first select profile is effected by division of counts, and wherein adjustment of the select probability-profile is effected by division of probabilities, increment by increment of signal quality.

10. A method according to claim 8 including the steps of:

generating a test normalised select probability-profile for a test device, generating a reference normalised select probability-profile for a similar reference device, and comparing or contrasting said test and reference profiles to highlight the difference there between.

11. A method according to claim 6 comprising the steps of:

generating a family of test profiles for a plurality of said ranges of signal quality, deriving a gradient-profile representing the gradient between the members of said family, and using said gradient-profile as an indicator of device performance.

12. A method according to claim 11 including the steps of:

generating said family of profiles for a plurality of said ranges of signal quality for the test device, generating said family of profiles for said plurality of said ranges of signal quality for a reference device, and comparing or contrasting said test and reference families of profiles to highlight the difference there between.

13. Circuit means for use in evaluating the performance of a signal processing device which is adapted to receive an incoming signal and to generate an outgoing signal derived therefrom, the circuit means comprising:

a first input for receiving one of said device signals as a first input signal, a second input for receiving the other one of said device signals as a second input signal, first gate means connected to said first input for sampling the quality of the first input signal at regular time intervals during an evaluation period, first accumulator means connected to said first gate means and adapted to accumulate sample counts according to increment of signal quality, second gate means connected to said second input for sampling the quality of the second input signal at said time intervals, and discriminator means connected to said second input and adapted to determine, for each sample of second input signal quality, whether or not the signal quality lies within a predetermined range, said discriminator being connected to prevent said first accumulator means from storing sample counts during time intervals when the quality of said second input signal lies outside said range, the profile of counts in said accumulator at the end of the evaluation period providing an indicator of device performance.

14. Circuit means according to claim 13 including:

a second accumulator connected to receive all sample counts of first input signal quality according to increment of signal quality, or alternatively connected to receive sample counts only during intervals when said second input signal quality lies outside said range, and normalisation circuit means adapted to adjust said profile of counts in accordance with the profile of total sample counts of first input signal quality.

15. Circuit means according to claim 13 including means for computing a probability profile from said count profile.

16. Circuit means according to claim 13, including a microprocessor with connected memory and visual output device adapted to store said profile in said memory together with a similar reference profile and to display the normalised and reference profiles on said visual output device in a contrasting manner.

* * * * *